US009020518B2

(12) United States Patent
Huang et al.

(10) Patent No.: US 9,020,518 B2
(45) Date of Patent: *Apr. 28, 2015

(54) GENERALIZED CODEBOOK DESIGN METHOD FOR LIMITED FEEDBACK SYSTEMS

(71) Applicant: Apple Inc., Cupertino, CA (US)

(72) Inventors: Kaibin Huang, Austin, TX (US); Jayesh H. Kotecha, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,920

(22) Filed: Jan. 6, 2014

(65) Prior Publication Data

US 2014/0119468 A1 May 1, 2014

Related U.S. Application Data

(63) Continuation of application No. 11/536,280, filed on Sep. 28, 2006, now Pat. No. 8,626,104.

(51) Int. Cl.
*H04W 72/00* (2009.01)
*H04B 7/04* (2006.01)
*H04B 7/06* (2006.01)
*H04L 1/00* (2006.01)

(52) U.S. Cl.
CPC ............ *H04B 7/0417* (2013.01); *H04B 7/0634* (2013.01); *H04B 7/0639* (2013.01); *H04B 7/0663* (2013.01); *H04L 1/0025* (2013.01); *H04L 1/0029* (2013.01)

(58) Field of Classification Search
CPC .. H04B 7/0456; H04B 7/0473; H04B 7/0478; H04B 7/0482; H04B 7/0639; H04B 10/5055; H04W 84/18
USPC .......... 370/310, 335, 342, 479, 343, 345, 350
See application file for complete search history.

(56) References Cited

U.S. PATENT DOCUMENTS

| | | | |
|---|---|---|---|
| 5,909,649 A | | 6/1999 | Saunders |
| 6,104,992 A | * | 8/2000 | Gao et al. ...................... 704/220 |
| 6,473,467 B1 | | 10/2002 | Wallace et al. |
| 6,968,092 B1 | | 11/2005 | Winger |
| 7,110,463 B2 | | 9/2006 | Wallace et al. |
| 7,139,328 B2 | | 11/2006 | Thomas et al. |
| 7,151,809 B2 | | 12/2006 | Ketchum et al. |

(Continued)

OTHER PUBLICATIONS

Xia et al., "Multiantenna Adaptive Modulation with Beamforming Based on Bandwidth-Constrained Feedback," IEEE Transactions on Communications, Mar. 2005, pp. 526-536, vol. 53, No. 3.

(Continued)

*Primary Examiner* — Khalid Shaheed
(74) *Attorney, Agent, or Firm* — Meyertons, Hood, Kivlin, Kowert & Goetzel, P.C.

(57) ABSTRACT

In a closed-loop wireless communication system, a codebook-based feedback mechanism is provided where each codeword indicates a particular profile to be used to provide a target performance measure (e.g., bit error rate or spectral efficiency) for the transmission channel. This may be accomplished by using a multi-stage quantization process to construct the codewords as a plurality of transmission parameters specifying a MIMO transmission scheme, precoding vector or matrix, power allocation in space/time/frequency, modulation and channel code.

18 Claims, 6 Drawing Sheets

(56) References Cited

U.S. PATENT DOCUMENTS

| | | | |
|---|---|---|---|
| 7,164,649 B2 | 1/2007 | Walton et al. | |
| 7,602,837 B2 | 10/2009 | Kotecha et al. | |
| 8,626,104 B2 * | 1/2014 | Huang et al. | 455/310 |
| 2003/0185309 A1 * | 10/2003 | Pautler et al. | 375/257 |
| 2004/0066761 A1 | 4/2004 | Giannakis et al. | |
| 2004/0108944 A1 | 6/2004 | Lee et al. | |
| 2004/0176950 A1 | 9/2004 | Chu | |
| 2005/0101259 A1 | 5/2005 | Tong et al. | |
| 2005/0117660 A1 | 6/2005 | Vialle et al. | |
| 2005/0130694 A1 * | 6/2005 | Medvedev et al. | 455/522 |
| 2006/0039493 A1 * | 2/2006 | Mukkavilli et al. | 375/267 |
| 2006/0067277 A1 | 3/2006 | Thomas et al. | |
| 2006/0072677 A1 | 4/2006 | Kwak et al. | |
| 2006/0092054 A1 | 5/2006 | Li et al. | |
| 2006/0093065 A1 | 5/2006 | Thomas et al. | |
| 2006/0121946 A1 | 6/2006 | Walton et al. | |
| 2006/0155534 A1 | 7/2006 | Lin et al. | |
| 2006/0155798 A1 | 7/2006 | Ketchum et al. | |
| 2006/0227903 A1 | 10/2006 | Niu et al. | |
| 2007/0070967 A1 | 3/2007 | Yang et al. | |
| 2007/0099571 A1 | 5/2007 | Withers et al. | |
| 2007/0127608 A1 | 6/2007 | Scheim et al. | |
| 2007/0160011 A1 | 7/2007 | Kim et al. | |
| 2007/0223619 A1 | 9/2007 | Lee et al. | |
| 2007/0249296 A1 | 10/2007 | Howard et al. | |
| 2007/0286304 A1 | 12/2007 | Kim et al. | |
| 2008/0075058 A1 | 3/2008 | Mundarath et al. | |
| 2008/0076370 A1 | 3/2008 | Kotecha et al. | |
| 2009/0190688 A1 | 7/2009 | Kotecha et al. | |

OTHER PUBLICATIONS

Goldsmith et al., "Variable-Rate Variable-Power MQAM for Fading Channels," IEEE Transactions on Communications, Oct. 1997, pp. 1218-1230, vol. 45, No. 10.

Love et al., "Limited Feedback Unitary Precoding for Spatial Multiplexing Systems," IEEE Transactions on Information Theory, Aug. 2005, pp. 2967-2976, vol. 51, No. 8.

Goldsmith, "The Capacity of Downlink Fading Channels with Variable Rate and Power," IEEE Transactions on Vehicular Technology, Aug. 1997, pp. 569-580, vol. 46, No. 3.

Huang et al., "Effect of Feedback Delay on Multi-Antenna Limited Feedback for Temporally Correlated Channels," Jul. 2006, 5 pages.

Huang et al., "Joint Beamforming and Scheduling for SDMA Systems with Limited Feedback," Jun. 2006, pp. 1-25.

Huang et al., "Limited Feedback for Temporally-Correlated Channels: Feedback Rate and Delay," 2006, pp. 1-40.

Huang et al., "Markov Models for Limited Feedback MIMO Systems," Jun. 2006, 4 pages.

Huang et al., "Multi-Antenna Limited Feedback for Temporally-Correlated Channels: Feedback Compression," Jul. 2006, 5 pages.

Huang et al., "Orthogonal Beamforming in SDMA Downlink with Limited Feedback," Jul. 2006, 8 pages.

Love et al., "Feedback Methods for Multiple-Input Multiple-Output Wireless Systems," May 2004, 161 pages.

Chow et al., "A Practical Discrete Multitone Transceiver Loading Algorithm for Data Transmission over Spectrally Shaped Channels," IEEE Transactions on Communications, Feb./Mar./Apr. 1995, pp. 773-775, vol. 43, No. 2/3/4.

Fischer et al., "A New Loading Algorithm for Discrete Multitone Transmission," Global Telecommunications Conference, GLOBECOM, 1996, pp. 724-728.

* cited by examiner

GENERALIZED CODEBOOK DESIGN METHOD FOR LIMITED FEEDBACK SYSTEMS

PRIORITY CLAIM

This application is a continuation of and claims the benefit of priority from U.S. patent application Ser. No. 11/536,280, entitled "Generalized Codebook Design Method for Limited Feedback Systems" and filed on Sep. 28, 2006 (issuing as U.S. Pat. No. 8,626,104 on Jan. 7, 2014), which is fully incorporated herein by reference for all purposes to the extent not inconsistent with this application.

FIELD OF THE INVENTION

The present invention is directed in general to field of information processing. In one aspect, the present invention relates to a system and method for wireless transmission using an adaptive transmit transmitter and receiver antenna arrays.

DESCRIPTION OF THE RELATED ART

Wireless communication systems transmit and receive signals within a designated electromagnetic frequency spectrum, but capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed, such as Multiple Input Multiple Output (MIMO), which is a transmission method involving multiple transmit antennas and multiple receive antennas. Various transmission strategies require the transmit array to have some level of knowledge concerning the channel response between each transmit antenna element and each receive antenna element, and are often referred to as "closed-loop" MIMO. For example, space division multiple access (SDMA) systems can be implemented as closed-loop systems to improve spectrum usage efficiency. SDMA has recently emerged as a popular technique for the next generation communication systems. SDMA based methods have been adopted in several current emerging standards such as IEEE 802.16 and the 3rd Generation Partnership Project (3GPP).

FIG. 1 depicts a wireless communication system 100 in which a transmitter 102 having a first antenna array 106 communicates with receiver 104 having a second antenna array 108, where each antenna array includes one or more antennas. The communication system 100 may be any type of wireless communication system, including but not limited to a MIMO system, SDMA system, CDMA system, OFDMA system, OFDM system, etc. In the communication system 100, the transmitter 102 may act as a base station, while the receiver 104 acts as a subscriber station, which can be virtually any type of wireless one-way or two-way communication device such as a cellular telephone, wireless equipped computer system, and wireless personal digital assistant. The signals communicated between transmitter 102 and receiver 104 can include voice, data, electronic mail, video, and other data, voice, and video signals.

As depicted in FIG. 1, the transmitter 102 transmits a signal data stream (e.g., signal s1) through one or more antennas 106 and over a channel $H_1$ to a receiver 104, which combines the received signal from one or more receive antennas 108 to reconstruct the transmitted data. To transmit the signal $s_1$, the transmitter 102 prepares a transmission signal, represented by the vector $x_1$, for the signal $s_1$. (Note: lower case bold variables indicate vectors and upper case BOLD variables indicate matrices). The transmission signal vector $x_1$ is transmitted via a channel represented by a channel matrix $H_1$. The channel matrix $H_1$ represents a channel gain between the transmitter antenna array 106 and the subscriber station antenna array 108. Thus, the channel matrix $H_1$ can be represented by an N×k matrix of complex coefficients, where N is the number of antennas at the base station antenna array 106 and k is the number of antennas in the subscriber station antenna array 108. As will be appreciated, the channel matrix $H_1$ can instead be represented by a k×N matrix of complex coefficients, in which case the matrix manipulation algorithms are adjusted accordingly so that, for example, the right singular vector calculation on a N×k channel matrix becomes a left singular vector calculation on a k×N channel matrix. The coefficients of the channel matrix $H_1$ depend, at least in part, on the transmission characteristics of the medium, such as air, through which a signal is transmitted. A variety of methods may be used at the receiver to determine the channel matrix $H_1$ coefficients, such as transmitting a known pilot signal to a receiver so that the receiver, knowing the pilot signal, can estimate the coefficients of the channel matrix $H_1$ using well-known pilot estimation techniques. Alternatively, when the channel between the transmitter and receiver are reciprocal in both directions, the actual channel matrix $H_1$ is known to the receiver and may also be known to the transmitter.

With conventional closed-loop MIMO systems, full broadband channel knowledge at the transmitter may be obtained by using uplink sounding techniques (e.g., with Time Division Duplexing (TDD) systems) and channel feedback techniques (e.g., with TDD or Frequency Division Duplexing (FDD) systems). Limited feedback methods, such as codebook-based beamforming weights selection, can reduce the amount of feedback as compared to full channel feedback, but the quantization techniques used in codebook systems to compress the channel feedback information can introduce errors in the feedback signal. Prior codebook-based solutions have used separate codebooks for each parameter being fed back, or have used codebooks which introduce loss in the link performance, increase the bit error rate or reduce the spectral efficiency.

Accordingly, an efficient feedback method is needed to provide the channel information to the transmitter using a codebook to reduce the size of the feedback signal while sustaining a minimal loss in link performance. There is also a need for an improved methodology for designing codebooks for use in a closed-loop system. In addition, there is a need for a system and methodology whereby codebooks are efficiently designed and used to provide channel information back to the transmitter/base station with reduced bit error rate and/or improved spectral efficiency. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

Figure 1:
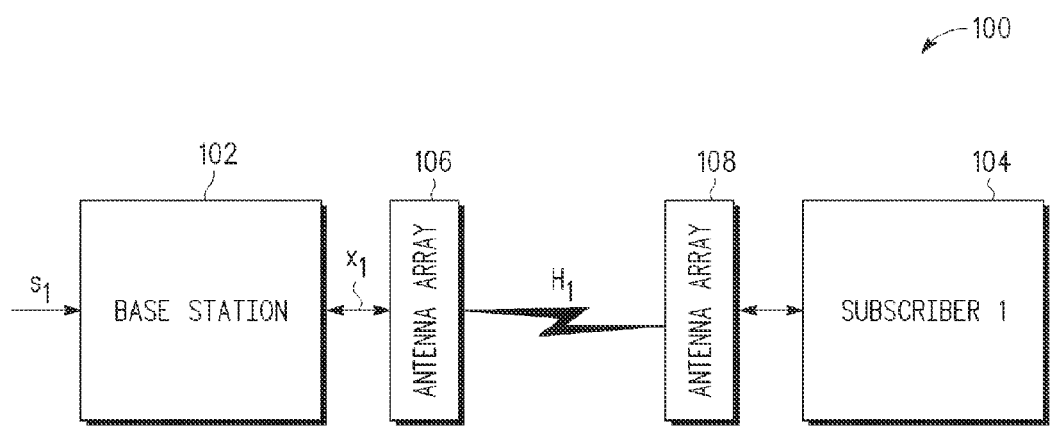
FIG. 1 (labeled prior art) depicts a wireless communication system.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

A generalized codebook design system and methodology are described for use in multi-antenna systems with quantized feedback, where a codebook contains an indexed list of transmission channel profiles specifying a plurality of parameters to be used in the transmission. Examples of these profiles include MIMO transmission schemes (e.g., beamforming, precoding, space-time block code, etc.), power allocation in space/time/frequency, modulation (e.g., OFDM, CCK, QPSK, BPSK, DBPSK, DQPSK, 16QAM, 64QAM, DSSS, etc.) and channel code. In a selected embodiment, a joint codebook is designed using profiles having a MIMO beamforming precoder parameter, a power allocation in time parameter, and modulation scheme parameter. Depending on how it is designed, the codebook may be used to enable beamforming and power control, to minimize the bit-error-rate for a fixed spectral efficiency, or to maximize the spectral efficiency for a target bit-error-rate to be achieved. In operation, each subscriber station independently determines the state of a communication channel in terms of a multi-parameter profile, uses the profile to retrieve a corresponding index from a codebook stored at the subscriber station, and transmits the index over a low rate feedback channel to a base station. At the base station, the received index is used to access a matching multi-parameter profile from a codebook stored at the base station, where this matching profile specifies the format for transmitting signals to the subscriber station.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
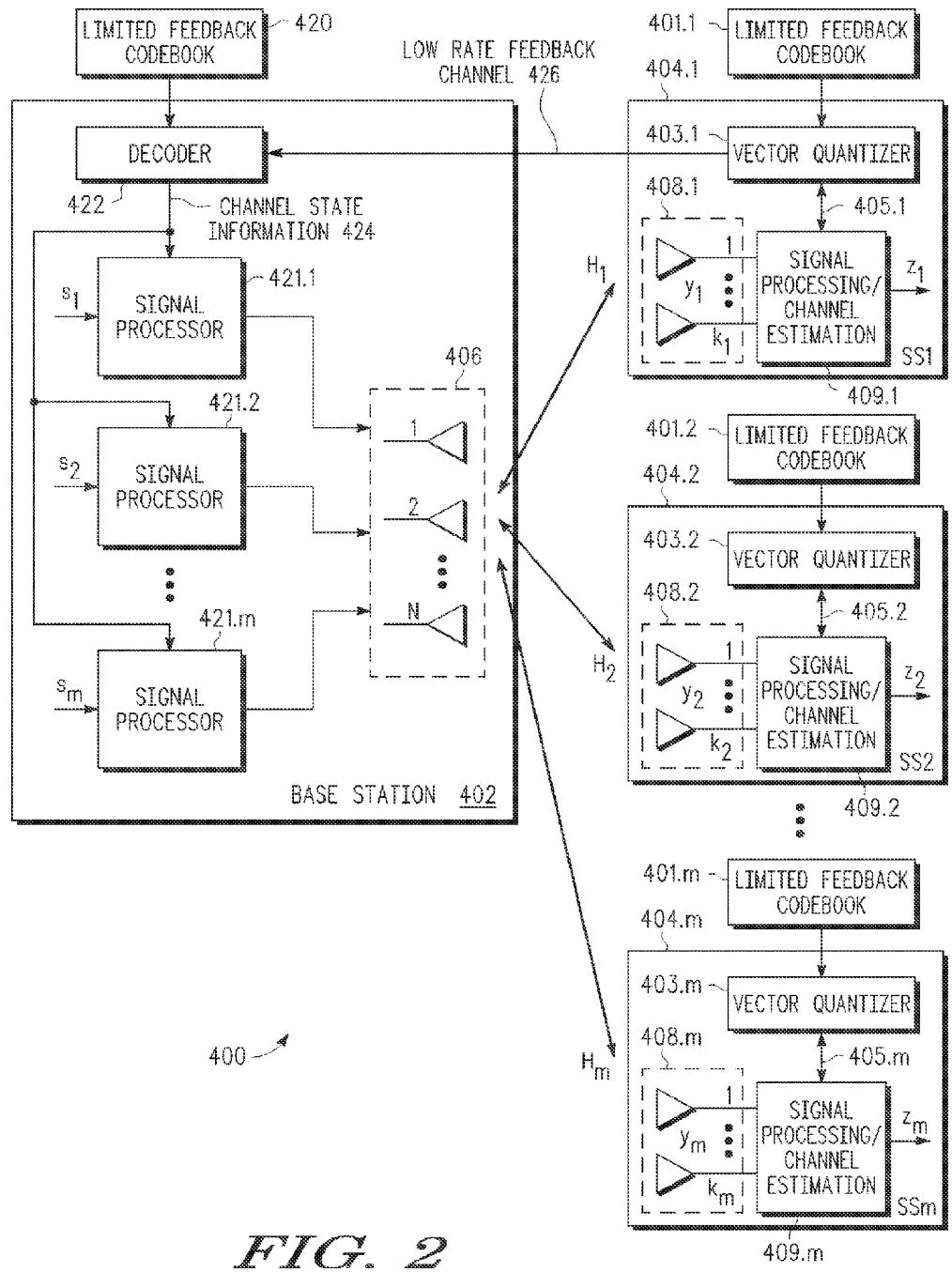
FIG. 2 depicts a wireless communication system in which limited feedback codebooks are used at a base station and subscriber stations.

FIG. 2 depicts a wireless communication system 400 with a base station 402 and m subscriber stations 404.1 through 404.m. The base station 402 includes an array 406 of one or more antennas for communicating with the subscriber stations 404.1 through 404.m, each of which includes an array 408.i having one or more antennas for communicating with the base station 402. In operation, a data signal $s_1$ presented at the base station 402 for transmission to the subscriber station 404.1 is transformed into a transmission signal, represented by the vector $x_1$. The signals transmitted from the transmit antenna 406 propagate through a matrix channel (e.g., $H_1$) and are received by the receive antennas (e.g., 408.1). For a MIMO channel from the base station 402 to the $i^{th}$ subscriber station 404.i, the channel is denoted by $H_i$, $i \in \{1, 2, \ldots, m\}$. The channel matrix $H_i$ is an $N \times k_i$ matrix of complex entries representing the complex coefficients of the transmission channel between each transmit-receive antenna pair, where N represents the number of base station 402 antennas, and $k_i$ represents the number of antennas of the $i^{th}$ subscriber station.

In the wireless communication system 400, channel knowledge at the subscriber station (e.g., 404.1) is fed back to the base station 402. For example, in a MIMO implementation, each subscriber station 404.1-m determines its MIMO channel matrix $H_i$—which specifies the transmission channel gain between a transmitter and an $i^{th}$ receiver—such as by using pilot estimation or sounding techniques to determine or estimate the coefficients of the channel matrix $H_i$. In other embodiments, the channel matrices used for transmitting and receiving are different (e.g. $H_{iT}$ and $H_{iR}$, from the $i^{th}$ subscriber station's perspective), such as in a frequency division duplex (FDD) system. Depending on the system design, the channel information required for adaptive transmission can be channel coefficients or their functions (e.g., a precoder, a beamforming vector or a modulation order). Rather than feeding back the entire vector or matrix representation of the transmission channel information (which would require a large number of bits), the receiver assembles or detects channel profile information that identifies the channel conditions between the transmitter and receiver and that will be used by the transmitter in controlling signal transmission to the receiver. This channel profile information (e.g., 405.1) is compressed or quantized using a quantizer (e.g., 403.1) and codebook (e.g., 401.1) at the subscriber station (e.g., 404.1) and returned to the base station 402 over a low rate feedback channel 426.

Based on the feedback, the base station 402 uses a decoder 422 to retrieve a transmission profile from the codebook 420 which includes a choice of MIMO scheme, modulation and channel code (over possibly multiple transmission streams/layers) and power allocation possibly in space, time and frequency for transmission to the subject subscriber station 404.1. The transmission profiles retrieved from the codebook 420 are processed by one or more signal processors 421.1-m in the base station 402 to design and control the signal transmission characteristics to make best use of the existing channel conditions for individual subscriber stations. For example, if implemented as a SDMA-MIMO system, the base station 402 uses the retrieved multi-parameter transmission channel profile for a particular subscriber station 404.$i$ to determine the weighting vector $w_i$ and combining vector $v_i$ for the subscriber station 404$i$ to reduce the bit error rate and/or to increase the spectral efficiency for each user. Once determined, the vectors $v_i$ are fed forward to the respective subscriber stations using conventional feed forward techniques. Alternatively, the codebook 420 at the transmitter/base station may be used to store an indexed set of possible vectors $v_i$ so that, instead of transmitting the complete vector information $v_i$, the transmitter 402 retrieves the corresponding index from the codebook 420 and feeds forward the index to the receiver (e.g., 404.1) which uses the index to access the corresponding vector $v_i$ information from the receiver codebook (e.g., 401.1). In yet another embodiment where both the transmitter and receiver share the estimated channel matrix information $\hat{H}_i$ for the $i^{th}$ receiver (e.g., after $\hat{H}_i$ has been fed back to the transmitter), the set of possible vectors $v_i$ for a given receiver 404.$i$ may be extracted from the channel matrix $\hat{H}_i$ as an ordered set, and an index which identifies which of the possible vectors corresponds to the designed vector $v_i$, is then fed forward to the receiver 404.$i$. At the receiver, the received index is used to extract the designed vector $v_i$ from the channel matrix $\hat{H}_i$. For example, in a channel between a transmitter (having four antennas) and a receiver (having two antennas), the designed combining vector $v_i$ will be selected from an ordered set of two possible right singular vectors $\{v_1, v_2\}$. As a result, rather than feeding forward the entire designed combining vector $v_i$ the transmitter can use a one-bit index to identify which of the ordered set is the designed combining vector $v_i$, thus saving feed forward overhead.

As will be appreciated, rather than feeding back quantized channel profile information or encoding parameters, the base station 402 can directly estimate the channel matrix $H_i$ for each subscriber station 404.1-$m$ (e.g., by using estimation mechanisms, such as sounding), and then use the assembled or estimated MIMO channel matrix information $H_i$ to determine the transmission profile for transmission to a particular subscriber station 404.$i$. Using a multi-parameter codebook at the base station, the transmission parameters may then be quantized into an index which is fed forward to the subscriber station 404.$i$ for use in processing and decoding the signal transmitted to the subscriber station 404.$i$.

Figure 3:
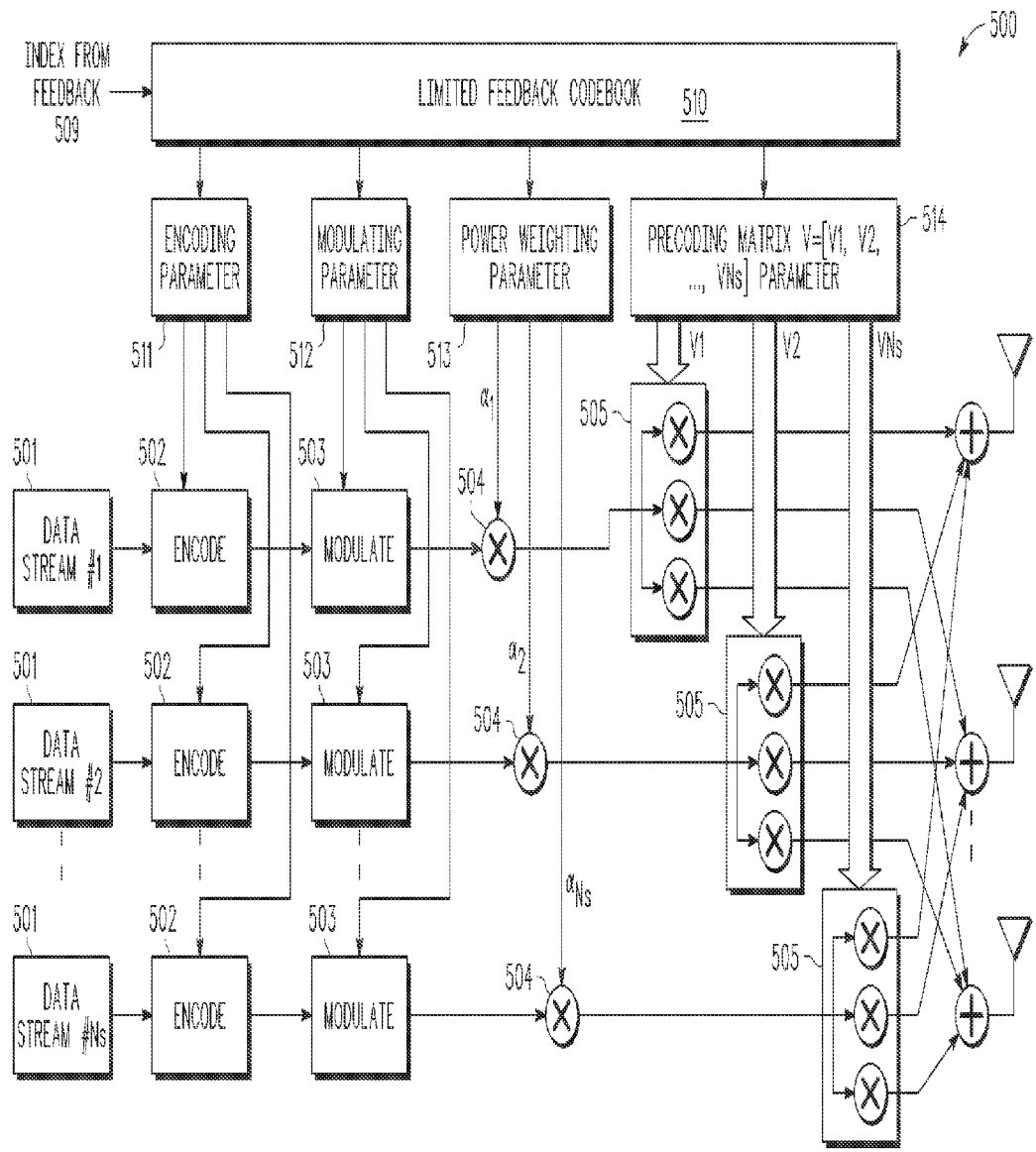
FIG. 3 depicts a block diagram of a transmitter using a multi-parameter codebook.

FIG. 3 is a block diagram of a transmitter unit 500 which uses a joint or hybrid multi-parameter codebook to specify a plurality of transmission control settings. In the transmitter 500, one or more data streams 501 are individually encoded (502), modulated (503), power weighted (504) and weighted for beamforming or precoded (505) using parameter values obtained from a single profile entry in the multi-parameter codebook to form the symbol streams to be transmitted, using the frequency and/or time domain resources. The profile entry is selected from the codebook on the basis of the index conveyed in the feedback message for a given channel. As depicted, each data stream may be encoded in 502 according to an encoding parameter 511 obtained from the selected codebook profile that is retrieved from the base station codebook 510 in response to the index 509 provided over the low rate feedback channel. In addition, the data stream may be modulated in 503 using the modulation parameter 512 contained in the selected codebook profile. In similar fashion, the data stream is power weighted in 504 according to the scalar weighting parameter 513 from the selected codebook profile. Finally, each stream is weighted in block 505 by a beamforming vector 514 that is contained in the selected codebook profile. As will be appreciated, a subset of the foregoing parameters may be extracted from the selected codeword profile and used to control the transmission settings, or additional parameters may be included in the codeword profile and used to control the transmission. Examples of profile parameters include, but are not limited to, scheduling parameters (to identify a particular user or receiver station), error correction coding parameters, a MIMO transmission scheme parameter, a precoding vector or matrix, power allocation in space/time/frequency, modulation parameters, channel code parameters or a codebook parameter (to specify one of a plurality of codebooks to be used). In selected embodiments, four or more channel profile parameters are stored in the codebooks of each transmitter and receiver and accessed using a single index value which is efficiently fed back from the receiver to the transmitter.

Figure 4:
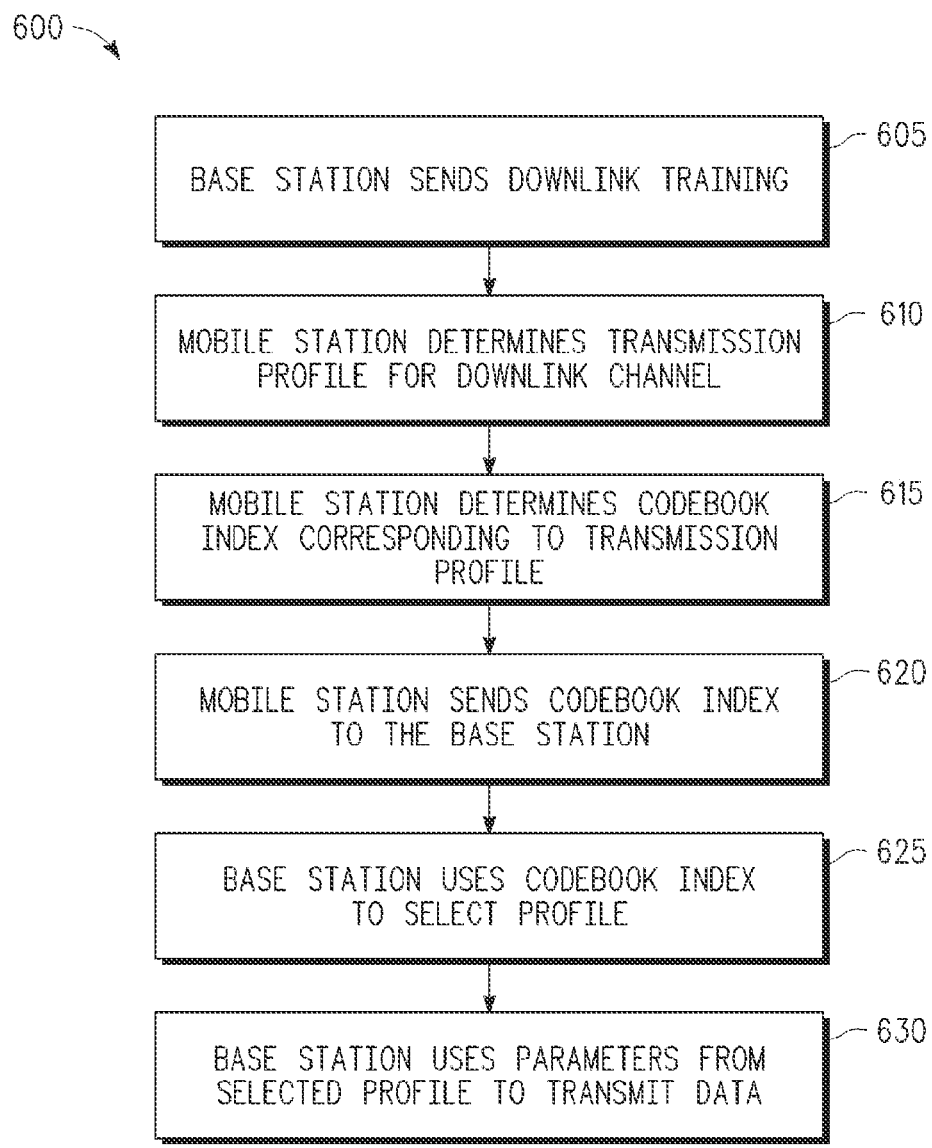
FIG. 4 depicts a process flow of a codebook-based feedback process.

FIG. 4 is a flowchart representation of a codebook-based feedback process used to transmit information between a base station and mobile station. First, the base station transmits pilot data (i.e., symbols known at both the base station and mobile station) from each of its transmit antennas on a downlink 605. Next, the mobile station receives the downlink pilot data and determines transmission profile from each of the base station's antennas to each of its receive antennas 610. Although the pilot signal may be transmitted by the base station and used by the mobile station for said channel estimation, alternative channel estimation techniques, such as blind or decision-directed channel estimation methods may sometimes be used in the absence of pilots or as a supplement to the pilot-based channel estimation. Subsequently, the mobile station encodes the transmission profile for the downlink channel, such as by determining a codebook index from the limited feedback codebook that corresponds to the transmission profile 615. The encoded profile is then transmitted in feedback to the base station 620. At the base station, the information in the feedback message is used to select a transmission profile 625 which contains a plurality of parameters that are used to transmit a downlink data transmission 630.

Figure 5:
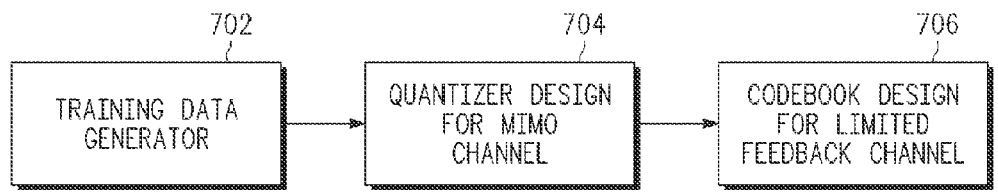
FIG. 5 depicts a first design flow methodology for designing a codebook for use in a limited feedback system.

To properly design the multi-parameter codebook described herein, a codebook design method is described with reference to FIG. 5 which depicts a first design flow methodology for designing a codebook for use in feeding back transmission channel state information for a MIMO channel in a limited feedback system. Generally, a transmission channel can be estimated by embedding a set of predetermined symbols, known as training symbols, at a transmitter and processing the training symbols at a receiver to produce a set of initial channel estimates. As depicted, a training sequence containing no actual information (e.g., random data) is generated by a training data generator 702. In this example, the MIMO transmission channel being estimated at the receiver may be characterized as a channel matrix H, and the singular value decomposition (SVD) of the MIMO channel matrix $H=U\Lambda V^H$, where the matrix U is a left eigen matrix representing the receive signal direction, the matrix $\Lambda$ represents the strength (or gain) of the channel and the matrix V is a right eigen matrix representing the transmit signal direction. Statistically, the directions and gain are independent, so the quantizer can be implemented in the form of a product code. Since only the channel strength and transmit signal direction need to be fed back to the transmitter, the feedback component for the MIMO channel $\tilde{H}=\Lambda V^H$, and the training data is generated based on the distribution of the feedback component $\tilde{H}$. For the special case of a multiple-input-single output (MISO) channel, the MISO channel h can be decomposed as $h=g\,u$, where $g=\|h\|$ is a positive scalar representing the channel gain, and $u=h/\|h\|$ is a unitary vector representing the transmit direction.

Using the received training data/symbols to estimate the MIMO transmission channel, the channel estimate information is quantized at step 704. For example, the space of $\tilde{H}$ may be partitioned using a multi-dimensional quantizer which outputs a set of partitions with assigned probabilities. Because the objective of channel quantization is to optimize a specific performance measure (such as the bit error rate (BER) or spectral efficiency), a performance measure should be used as the distortion function for customizing conventional vector quantization (VQ) algorithms. Note that conventional VQ algorithms are not well suited for channel quantization because they usually use the simple mean square error (MSE) function as the distortion measure. While simple VQ algorithm designs may be used for some special cases (such as the ones using modified MSE distortion functions), it is difficult to modify conventional VQ designs to use more complicated distortion functions such as the chordal distance function. As described more fully below, lower complexity encoding may be obtained by separating the channel quantization step 704 into two or more quantization stages.

At step 706, the limited feedback codebook is constructed by assigning a plurality of MIMO channel parameters to each of the partitions from step 704. Examples of such channel parameters include, but not limited to, scheduling parameters (to identify a particular user or receiver station), error correction coding parameters, a MIMO transmission scheme parameter, a precoding vector or matrix, power allocation in space/time/frequency, modulation parameters, channel code parameters or a codebook parameter (to specify one of a plurality of codebooks to be used). In particular, the codebook is constructed by assigning to each partition in the space of $\tilde{H}$ a profile that includes a plurality of transmission parameters (e.g., parameters including a precoding matrix parameter, a power level parameter and a modulation order parameter). The resulting codebook is then stored in the transmitter and receiver for use in a closed-loop limited-feedback system, such as depicted in FIG. 2.

To overcome the design complexity of integrating channel quantization and codebook design, a design procedure is proposed in which channel quantization and the codebook design are separated, but not independent. While the division of the channel quantization process into separate stages (e.g., quantization of eigenvectors and quantization of eigenvalues) results in a sub-optimal design, the sub-optimality can be minimized by optimizing the codebook for a given channel quantization scheme. Also, it will be appreciated that the two quantization stages are not independent, and that the second step is optimized, based on the first step. This results in the reduction of the sub-optimality of separate quantization, and also results in the lower complexity in encoding.

Figure 6:
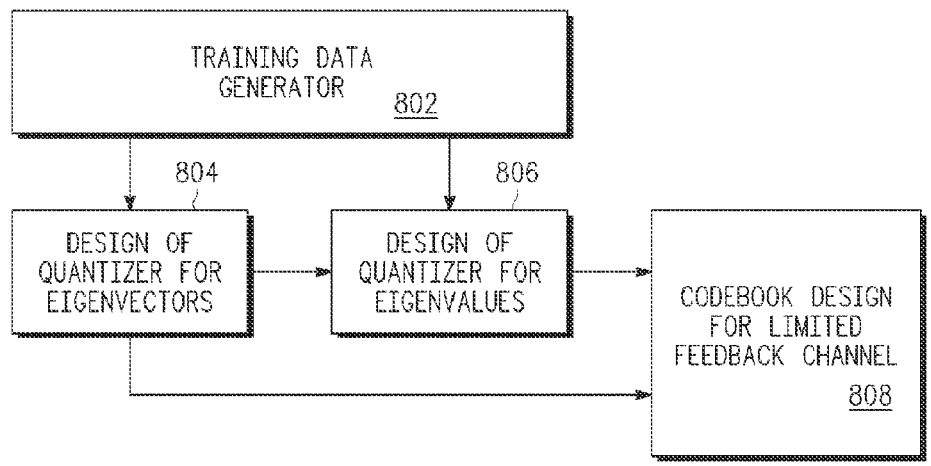
FIG. 6 depicts a second design flow methodology for designing a codebook for use in a limited feedback system.

An exemplary multi-stage codebook design procedure is illustrated in FIG. 6, which depicts a design flow methodology for designing a codebook for use in a limited feedback system in which the codebook design process is divided into a plurality of stages. As depicted, the training data is generated and received over the channel of interest at step 802. The received training data is then processed in a multi-stage process, including at least a first stage 804 for quantization of the channel eigenvector space, a second stage 806 for quantization of the eigenvalue space, and a third stage 806 for codebook design.

As for the first eigenvector quantization stage 804, the proposed methodology observes the general rule for quantization that, for a fixed number of quantization points, reducing the number of dimensions of the space in which the input is distributed results in smaller quantization errors. Based on this rule, instead of quantizing the entirety of the MIMO channel H, only part of H (specifically $\Lambda V^H$) is quantized. In an example embodiment for generating two-parameter MIMO transmission channel profiles, the eigenvector quantization step 804 operates to partition the right eigenvector space V, while the eigenvalue quantization step 806 operates to partition the channel eigenvalue space $\Lambda$. As for MISO channels, coherent detection techniques may be used to reduce the number of dimensions of the space for h needed to be quantized. As a result, the first stage 804 quantizes the column space of eigenvector V for H for MIMO channels, and quantizes the space of eigenvector u for h for MISO channels.

The quantization of the column space of V is more challenging than that of the vector space of u because the conventional VQ algorithm (modified to introduce a phase term as shown in [2] below) can be directly applied on the latter, but cannot be applied to the former without some manipulation. As a result, the relatively simpler case of quantizing the vector space of u, corresponding to the MISO channel h, is described first. Subsequently, corresponding to the MIMO channel, quantization of the column space of V using the VQ algorithm is described.

Firstly, some notations are introduced. By quantization, each unitary code vector is assigned a partition of the unitary vector space $O^L$. The partition for the ith vector $\hat{u}_i$ is represented as $X_i$, and the codebook as U with size of the codebook given by $|U|=N_1$. The MSE distortion function that is commonly used in the field of quantization is modified as $$d_1(\hat{u};u)=\|\hat{u}e^{j\Theta}-u\|^2 \quad [1]$$

where the phase rotation $e^{j\Theta}$ is provided by the receiver to reduce the number of vector space dimensions to be quantized. It can be shown that the optimal phase rotation that minimizes the distortion $d_1(\hat{u}, u)$ is $$e^{j\Theta}=\hat{u}^H u/\|\hat{u}^H u\|. \quad [2]$$

By substituting [2] into [1], $$d_1(\hat{u};u)=2(1-|\hat{u}^H u|^2). \quad [3]$$

The design objective of quantization is to find the codebook U that minimizes the average distortion defined as $$D_1(U, X_1, \ldots, X_N) = \sum_{i=1}^{N_1} \int_{X_i} d_1(u, \hat{u}_i) f_u(u) du \bigg/ \int_{X_i} f_u(u) du \quad [4]$$

where $f_u(u)$ is the probability density function of u. Hence $$(U, X_1^*, \ldots, X_{N_1}^*) = \arg\min_{U,\{X_i\}} D_1(U, X_1, \ldots, X_{N_1}) \quad [5]$$

Based on the Lloyd algorithm, the quantization algorithm are comprised of two steps:
partitioning the unitary space O and computation of the code vectors in U. For the first step, given the codebook U, partitions are defined by applying the nearest-neighbor rule with the distance measure $d_1(u;\hat{u})$ in [3]. The result is that $$\forall i=1\ldots N_1, d_1(u;\hat{u}_i) \leq d_1(u;\hat{u}_j) \forall u \in X_i \text{ and } j \neq i. \quad [6]$$

For the second step, the centroid of the partitions $\{X_i\}$ is computed and used to update the codebook U. The centroid of the i th partition can be obtained as $$\hat{u}_i^* = \underset{\hat{u}}{\operatorname{argmin}} \int_{X_i} d_1(u;\hat{u}) f_u(u) du \bigg/ \int_{X_i} f_u(u) du \quad [7]$$

$$= \underset{\hat{u}}{\operatorname{argmin}} \int_{X_i} |u^H \hat{u}|^2 f_u(u) du \bigg/ \int_{X_i} f_u(u) du$$

$$= \underset{\hat{u}}{\operatorname{argmax}} \hat{u}^H R_i \hat{u}.$$

where $$R_i = \oint_{X_i} u u^H f_u(u) du \bigg/ \oint_{X_i} f_u(u) du \quad [8]$$

It is well known that the unitary vector û that maximizes the term in [7] points to the direction of the largest eigenvalue of $R_i$, and hence is equal to the corresponding eigenvector. The complete procedure of the shape quantization algorithm is summarized in Algorithm 1:

Algorithm 1—Quantization Algorithm for u
Step 0: Initialize codebook U with randomly generated unitary vectors following the uniform distribution, and choose a stopping criterion $\epsilon \in R_+$.
Step 1: With the codebook U fixed, partitions $\{X'_i\}_{i=1 \ldots N_1}$ are found using [6].
Step 2: Given the partitions $\{X_i\}_{i=1 \ldots N_1}$, new beamforming vectors can be computed using an iterative process in [7] to update the codebook U.
Step 3: Iteration is terminated if the average distortion $D_1$ in [4] satisfies $D_u \leq \epsilon$. Otherwise go to step 1.

Having discussed eigenvector quantization for MISO channel, the case of MIMO channel can now be described. If there are more transmit antennas than receive antennas ($M_t \geq M_r$), then among the $M_t$ column vectors of V, only $M_r$ vectors correspond to nonzero eigenvalues since the rank of the channel matrix is min($M_r, M_t$). To avoid wasting power, the transmitter should concentrate the signal power in the unitary vector space $O^{M_t \times M_r}$ defined by the $M_r$ column vectors of V, corresponding to nonzero eigenvalues. As the result, only the subspace $O^{M_t \times M_r}$ need be quantized rather than the whole column space of V. To apply the VQ (Lloyd) algorithm described above, the $M_r$ columns of V can be stacked to form a long vector. As will be appreciated, other methods may be used to quantize the unitary space $O^{M_t \times M_r}$.

The second eigenvalue quantization stage 806 will now be described, first with reference to the case of a MISO channel and then the case of a MIMO channel. For the MISO channel, the positive scalar space $R_+$ (in which the channel gain g from the equation h=gu is defined) is quantized. The unitary vector codebook U and the partitions $\{X_i\}$ (obtained as described above) remain unchanged in computation of the gain codebook denoted as G. Its cardinality is |G|=$N_2$. The partition of the j th value is $\hat{g}_j$ represented as $Y_j$. The objective for the proposed algorithm for quantizing the channel gain g is to minimize the following distortion function:

$$d(h; \hat{g}, \hat{u}) = \|\hat{g} \hat{u} e^{j\Theta} - h\|^2 \quad [9]$$

where û is selected from the codebook U such that the distortion function in [3] is minimized, and the phase rotation $e^{j\Theta}$ is given in [2]. By substituting g and [2], the following the distortion function is obtained for quantizing g:

$$d_2(g; \hat{g}) = (g - \hat{g}|\hat{u}^H u|)^2. \quad [10]$$

It can be observed from [10] that the quantization of g is optimized from that of u rather than being independent.

With distortion measured using [10], the standard Lloyd algorithm can be applied to design the codebook G containing an optimal set of quantized g values. The two iterative steps of Lloyd algorithm are as described hereinabove, where one of the steps is partitioning using the nearest-neighbor rule, and $$\forall i=1 \ldots N\_2, d_2(g; \hat{g}_i) \leq d_2(g; \hat{g}_j) \forall g \in Y_i \text{ and } j \neq i \quad [11]$$

The other step, centroid computation, can be depicted mathematically as follows $\forall j=1 \ldots N_2$, $$\hat{g}_j^* = \underset{\hat{g}}{\operatorname{argmin}} \int_{Y_j} d_2(g; \hat{g}) f_g(g) dg \bigg/ \int_{Y_j} f_g(g) dg \quad [12]$$

$$= \underset{\hat{g}}{\operatorname{argmin}} (\hat{g} - \overline{g}_j)^2 + \tilde{g}_j - \overline{g}_j^2 \quad [13]$$

$$= \overline{g}_j \quad [14]$$

where $$\tilde{g}_j = \int_{Y_j} |\hat{u}(h)^H h|^2 f_h(h) dh \bigg/ \int_{Y_j} f_h(h) dh \quad [15]$$

$$\overline{g}_j = \int_{Y_j} |\hat{u}(h)^H h| f_h(h) dh \bigg/ \int_{Y_j} f_h(h) dh \quad [16]$$

The quantization algorithm for g is summarized in Algorithm 2.

Algorithm 2—Quantization Algorithm for Gain
Step 0: Initialize codebook G using random numbers generated following the probability density function of g. Choose the stopping criteria $\epsilon \in R_+$.
Step 1: Fix the codebook G and obtain partitions $\{Y_j\}$ using [11].
Step 2: Fix the partitions $\{Y_j\}$ and compute new codewords using [14]. Update the codebook G.
Step 3: Exit if the average distortion $D_2$ satisfies $D_2 \leq \epsilon$. Otherwise go to Step 1.

With the foregoing approach, the second and third stages 806, 808 may be optimized, based on the results obtained from the previous stages. The separately staged quantization of eigenvector and eigenvalue space at stages 804, 806 is motivated by the independent distribution of eigenvectors and eigenvalues for an independently and identically distributed (i.i.d.) MIMO channel. However, the quantization stages 804, 806 are not completely separated since the eigenvalue quantization 806 is optimized for the eigenvector quantization 804. With separately staged quantization, the encoding can be also performed in separate stages. As shall be shown, successive encoding has much lower complexity than conventional exhaustive-search designs. In addition, the separation of channel quantization and codebook design allows simple MSE-like distortion functions to be used in quantization, thereby simplifying both the quantization and the codebook design procedures. Finally, it should be noted that, by integrating coherent detection in channel quantization, the proposed two-stage quantization method can outperform the optimized full-search VQ algorithms.

By using the channel quantization algorithms described herein, two codebooks U☐ and G may be designed. For a MISO channel, U☐ and G consist of $N_1$ vectors and $N_2$ scalar values, respectively. For MIMO channels, U and G are comprised of $N_1$ matrices and $N_2$ vectors, respectively. Due to the fact that G is optimized for U, they form a so-called product-code denoted as U×G. The product codebook entries represents $N=N_1N_2$ partitions of the space of the MIMO channel H or the MISO channel h.

These partitions may be used to design a limited feedback codebook at the third stage 808. In an example embodiment, unitary precoding is used to feed back MIMO channel information in a limited feedback system so that only precoding is adapted, and transmission power and modulation are kept constant. As a result, the limited feedback codebook is the same as the one for quantizing the eigenvector space of H described herein with reference to the first stage 804. With this example, the encoding using the codebook has two steps. First, the "right-hand" eigenvectors of H corresponding to nonzero eigenvalues ($M_r$) are used to form a matrix $\tilde{V}$. Second, the entry in the codebook that is closest to $\tilde{V}$ in distance is selected as the precoding matrix. While the Chordal distance may be used to measure the distance between matrices, it will be appreciated that any desired technique may be used. Finally, the index corresponding to the selected codebook entry is output and returned to the transmitter over the limited feedback channel.

In another embodiment, adaptive power control and beamforming vector parameters for a MISO channel are encoded into a limited feedback codebook which is constructed from a first component codebook of unitary vectors $[\hat{u}_1, \hat{u}_2, \ldots, \hat{u}_M]$ and a second component codebook of scalars $[\hat{g}_1, \hat{g}_2, \ldots, \hat{g}_N]$ using the proposed joint quantization algorithm. The two codebooks are used for quantizing the unitary vector and the gain of a channel vector, respectively. Another output of the algorithm is a set of probabilities $[P_1, P_2, \ldots, P_N]$, where $P_i$ is the probability that the channel gain is quantized to be $\hat{g}_i$. The selection of the beamforming vector from the codebook U is straightforward. The optimal beamforming vector is the codebook entry that maximizes the value of $|\hat{u}^H u|^2$ where u is the unitary vector derived from h. The design of discrete power levels corresponding to the discrete channel gains in the codebook G may be accomplished using the convex optimization technique given below. Assuming the channel has only discrete values as given in G and the modulation is BPSK/QPSK modulation, the average BER can be written as $$\bar{P}_b \approx \frac{1}{N_2} \sum_{m=1}^{N_2} Q\left(\sqrt{2\hat{g}_m^2 \gamma_m}\right) Pr(g \in Y_m) \quad [17]$$

where $\gamma_1, \ldots, \gamma_{N_2}$ represent power distribution and the noise variance is normalized to be 1. To simplify the design, the following approximation for the Q function is used:

$$Q(x) \approx (\tfrac{1}{2})\exp(-x^2/2). \quad [18]$$

The above function is known to be convex, and hence from [17], a convex optimization problem is formulated as follows:

$$(\gamma_m^*)_{m=1}^{N_2} \approx \operatorname*{argmin}_{\gamma_m} \sum_{m=1}^{N_2} \frac{1}{2} \exp\left(-\hat{g}_m^2 \gamma_m\right) Pr(g \in Y_m)$$

$$\text{s.t.} \sum_{m=1}^{N_2} \gamma_m Pr(g \in Y_m) = P_0 \quad [19]$$

where without loss of generality, it is assumed that $0 \leq \hat{g}_1 \leq \hat{g}_2 \leq \ldots \leq \hat{g}_{N_2}$ and the second equation in [19] specifies the power constraint so that the average power over time is constrained. By solving the above optimization problem, the third component codebook $[\gamma_1, \gamma_2, \ldots, \gamma_N]$ can be constructed using the following equations [20] and [21]

$$\gamma_m^* = \begin{cases} \dfrac{1}{\hat{g}_m^2} \ln \dfrac{\hat{g}_m^2}{2v} & m \geq m^* \\ 0 & m < m^* \end{cases} \quad [20]$$

where $$v = \frac{1}{2}\exp\left(\frac{\sum\limits_{m=m^*}^{M} \dfrac{\ln \hat{g}_m^2}{\hat{g}_m^2} Pr(g \in Y_m) - P_0}{\sum\limits_{m=m^*}^{M} \dfrac{1}{\hat{g}_m^2} Pr(g \in Y_m)}\right) \quad [21]$$

where $m^a$ is the largest integer that satisfies the following condition:

$$\frac{1}{\hat{g}_{m^*}^2} \ln \frac{\hat{g}_{m^*}^2}{2v} \geq 0 \quad [22]$$

With power levels given in [20], a $N_1 \times N_2$ limited feedback product codebook $[\hat{u}_1, \ldots, \hat{u}_M] \times [\gamma_1, \ldots, \gamma_N]$ can be obtained with the (i, j)th entry being $(\hat{u}_i, \gamma_j^a)$, which allows beamforming and power control as follows. First, the channel direction u and channel gain g are quantized into indices i and j which satisfy following conditions $$i = \operatorname*{argmax}_n |\hat{u}_n^H u|^2 \quad [23]$$

$$j = \operatorname*{argmin}_m \left(g - \hat{g}_m |\hat{u}_i^H u|\right)^2. \quad [24]$$

Second, $\hat{u}_i$ and $\gamma_j$ are applied as the beamforming vector and transmission power.

In yet another embodiment, the adaptive modulation, power control and beamforming vector parameters for a MISO channel are encoded into a limited feedback codebook with the objective of minimizing the symbol error rate under average rate and power constraints. The first component codebook of unitary vectors $[\hat{u}_1, \hat{u}_2, \ldots, \hat{u}_M]$ and the second component codebook of scalars $[\hat{g}_1, \hat{g}_2, \ldots, \hat{g}_N]$ may be constructed using the proposed joint quantization algorithm described above. Moreover, the joint quantization algorithm may be used to determine 1) a set of probabilities $[P_1, P_2, \ldots, P_N]$, where $P_i$ is the probability that the channel gain is quantized to be $\hat{g}_i$, and 2) a set of scalars $[\bar{\eta}_1, \bar{\eta}_2, \ldots, \bar{\eta}_N]$, where $\bar{\eta}_i$ is the square of the average of the channel gain values that are quantized to be $g_i$. Accordingly, the description will focus on the design of power levels and adaptive modulation, though for simplicity, the gain codebook size and hence the number of power levels are assumed to be equal to the number of QAM modulation orders.

The selection of a beamforming vector from the codebook U causes the effective channel power to be less than or equal to the power of the channel vector h. The effective channel power, denoted using η, can be written as $$\eta = |\hat{u}^H h|^2 \quad [25]$$

where $\hat{u}$ is the optimal beamforming vector selected from U.

We shall formulate an optimization problem based on the effective channel power. The modulation used is QAM with $N_2$ possible orders, hence $M=, 0, 2, 4, \ldots, 2^{N_2-1}$. For simplicity, we assume the numbers of power levels is also equal to $N_2$ and represent them as $\xi_1, \ldots \xi_{N_2}$. Each power level is assigned to a modulation order, e.g., $\xi_1$ for $M_1$ and $\xi_2$ for $M_2$. The range of $\eta$ shall be partitioned and resultant partitions, $A_1, \ldots, A_{N_2}$, be assigned to different pairs of $(M_i, \xi_i)$. The SER for squared M-ary QAM can be approximated using its upper bound as:

$$P_e(\eta) \approx \alpha \exp\left[-\frac{\beta \xi(\eta)\eta}{M(\eta)-1}\right] \quad [26]$$

where $\alpha$ and $\beta$ are scalar constants, and $\xi(\eta)$ and $M(\eta)$ are the power and modulation control functions, respectively. Using the above notations, the average symbol-error-rate (SER), power constraint ($P_0$), and rate constraint ($R_0$) can be expressed as follows $$P_e = \sum_{i=1}^{N_2} \int_{A_i} \alpha \exp\left(-\beta \frac{\xi_i \eta}{M_i - 1}\right) f_\eta(\eta) d\eta \quad [27]$$

$$R_0 = \sum_{i=1}^{N_2} \log_2 M_i Pr(\eta_i) \quad [28]$$

$$P_0 = \sum_{i=1}^{N_2} \xi_i Pr(\eta_i) \quad [29]$$

where $$Pr(\eta_i) = \int_{A_i} f_\eta(\eta) d\eta \quad [30]$$

and $f_\eta(\eta)$ is the probability density function of $\eta$. The optimization problem we shall solve is to minimize the SER in [27] given the power and rate constraints in [29] and [28], respectively. To minimize SER under a rate constraint, the optimal modulation order should be proportional to the effective channel power, and is chosen from $[M_1, M_2, \ldots, M_I]$ corresponding to a channel gain as $$M(g^2) = \begin{cases} M_i, & M_i \le \frac{g^2}{\eta^*} \le M_{i+1} \\ 0, & 0 \le \frac{g^2}{\eta^*} \le M_1 \end{cases} \quad [31]$$

where $\eta^*$ is selected such that [31] satisfies the average rate constraint of $$R_0 = \sum_{i=1}^{N} \log_2 M(\hat{g}_i^2) P_i.$$

The SER lower bound has to be obtained by repeatedly applying Jensen's inequality on [27]

$$P_{e,DROP} \ge \sum_{i=1}^{N_2} \alpha \exp\left(-\beta \frac{\xi_i \bar{\eta}_i}{M_i - 1}\right) Pr(\bar{\eta}_i) \quad [32]$$

$$\ge \alpha \exp\left(-\beta \sum_{i=1}^{N_2} \frac{\xi_i \bar{\eta}_i}{M_i - 1} Pr(\bar{\eta}_i)\right). \quad [33]$$

where $$\bar{\eta}_i = \int_{A_i} \eta f_\eta(\eta) d\eta. \quad [34]$$

The equality for [32] can be approached by high-rate feedback and hence using a large set of modulation orders and power levels. The equality for [33] can be achieved by setting the SNR as $$\gamma_0^{\hat{a}} = \frac{\xi_i \bar{\eta}_i}{M_i - 1}, \forall i = 1, \ldots, K'. \quad [35]$$

The optimal power control function, $\xi_i$, is obtained by ensuring equality in [32]. By applying the power constraint on [35], the transmission power is determined as $$\xi_i^{\hat{a}} = \frac{\gamma^{\hat{a}}}{\bar{\eta}_i}(M(\hat{g}_i^2) - 1), \forall i = 1, \ldots, N, \quad [36]$$

where $$\gamma^{\hat{a}} = \frac{\bar{P}_0}{\sum_{i=1}^{N} \frac{M_i - 1}{\bar{\eta}_i} P_i}. \quad [37]$$

Combining the above results, a product codebook $[\hat{u}_1, \ldots, \hat{u}_M] \times [\xi_1, \ldots, \xi_N]$, which allows beamforming, adaptive modulation and power control, is obtained as follows. First, the channel direction u and channel gain g are quantized into indices $$i = \arg\max_m |\hat{u}_m^H u|^2 \quad [38]$$

$$j = \arg\min_n (g - \hat{g}_n |\hat{u}_i^H u|)^2. \quad [39]$$

Second, $\hat{u}_i$, $M(\hat{g}_j)$ and $\xi_j$ are applied as the beamforming vector, modulation order and transmission power, respectively.

The process of quantized feedback enabling adaptive modulation and power control is described as follows. The modulation order is determined by a receiver using estimated channel information and [31]. The index of the modulation order is sent back to a transmitter, where the transmission order is applied on the transmitted signals. Furthermore, the transmission power level is determined using [36]. Through this process, the average SER is minimized.

As will be appreciated, the techniques disclosed herein may be used to generate other codebooks, such as, for example, encoding the adaptive modulation, power control and beamforming vector parameters for a MISO channel into a limited feedback codebook with the objective of maximizing throughput under a bit error rate constraint. The idea is to assign different modulation orders to different values of the channel gains resulted from transmit beamforming, hence $|\hat{u}^H h|^2$, such that the throughput is maximized.

In an example implementation, a codebook which maximizes throughput under a BER constraint is constructed by using the proposed joint quantization algorithm to construct a first component codebook of unitary vectors $[\hat{u}_1, \hat{u}_2 \ldots, \hat{u}_M]$ and a second component codebook of scalars $[\hat{g}_1, \hat{g}_2 \ldots, \hat{g}_N]$, and to obtain a set of probabilities $[P_1, P_2 \ldots, P_N]$, where $P_i$ is the probability that the channel gain is quantized to be $\hat{g}_i$.

By combining the above, a product codebook $[\hat{u}_1, \ldots, \hat{u}_M] \times [\hat{g}_1, \ldots, \hat{g}_N]$ is obtained which allows beamforming, adaptive modulation and power control as follows. First, the channel direction u and channel gain g are quantized into indices $$i = \underset{m}{\operatorname{argmax}} |\hat{u}_m^H u|^2 \qquad [40]$$

$$j = \underset{n}{\operatorname{argmin}} (g - \hat{g}_n |\hat{u}_i^H u|)^2. \qquad [41]$$

Second, $\hat{u}_i$ is applied as the beamforming vector. The quantized channel gain, $\hat{g}_j$, is used to obtain the power level and modulation order, as set forth below.

Using the above notations, the rate constraint (R) and the power constraint ($P_0$) are expressed as follows:

$$R = \sum_{i=1}^{N} \log_2\left(1 + \frac{\hat{g}_i^2 \xi_i}{k_0}\right) P_i, \qquad [42]$$

$$P_0 = \sum_{i=1}^{N} \xi_i P_i, \qquad [43]$$

where $\xi_i$ is the power level and $k_0$ is given as follows with $BER_0$ denoting the required BER:

$$k_o = \frac{-1}{\beta} \ln\left(\frac{BER_O}{\alpha}\right) \qquad [44]$$

Using an adaptive modulation algorithm, such as a modified version of the algorithm described in A. J. Goldsmith et al., "Variable-rate variable-power MQAM for fading channels," IEEE Trans. On Communications, vol. 45, No. 10 (1997), the power control $\xi_i$ and adaptive modulation values $M_i$ are expressed as follows:

$$\xi_i = \begin{cases} \sum_i \frac{P_i}{\hat{g}_i^2} + \overline{P}_0 - \frac{k_0}{\hat{g}_i^2}, & i \geq i^* \\ 0, & i < i^* \end{cases} \qquad [45]$$

$$M_i = 1 + \frac{\hat{g}_i^2 \xi_i}{k_o} \quad i \, i^*,$$

where $i^*$ is the smallest integer i where $1 \leq i \leq N$ such that the power constraint is satisfied.

With the disclosed approach of quantizing and feeding back the adaptive modulation, power control and beamforming vector parameters as an index to the feedback codebook, throughput over the existing channel conditions is maximized under the bit error rate constraint.

Conventionally, the full-search VQ algorithm is used for quantizing a vector space, such that the average MSE $E[\|h - \hat{h}\|^2]$ is minimized. Compared with the proposed design, the full-search VQ algorithm generates only a single codebook, and supposedly has superior performance. However, for fair comparison with the proposed algorithm, the MSE function is modified by including a phase rotation for reducing the space dimensions to be quantized. Since h is independently and identically distributed, the phase can be set to be that of the first element $h_1$. Therefore, for the full-search VQ algorithm in comparison, the distortion function is $\|h \exp(j\omega) - \hat{h}\|^2$ with $\exp(j\omega) = h_1/|h_1|$. The full-search algorithm is so named because the resultant encoding requires exhaustive search of the codebook design using this algorithm. The encoding complexity corresponding to the full-search VQ algorithm can be computed using the formulas shown below in Table 1. The number of storage and arithmetic operations are for real numbers.

Using the proposed two-stage quantization in FIG. 6, two codebooks G and U are designed for channel gain g and unitary vector u, respectively. These codebooks form a product codebook denoted as U×G, whose (i, j)th entry corresponds to $g_i, u_j$. For each input h, encoding is performed by first finding the column j such that $|u_j^H u|^2$ is maximized, and then second, finding the row i with j fixed such that $(g - \hat{g}|u_j^H u|)^2$ is minimized. Compared with exhaustive search, the above two-step encoding requires fewer comparisons. Hence, for the same codebook size $N = N_1 N_2$, the encoding for the proposed quantization algorithm is expected to be simpler than that for the full-search VQ algorithm. The complexity of the two-step encoding can be computed using the formulas also shown in Table 1.

TABLE 1

Encoding complexity of proposed and conventional quantizers
(L is vector length and N = $N_1 N_2$)

|  | New | Conventional |
| --- | --- | --- |
| Storage | $2LN_1 + N_2$ | $(2L - 1)N$ |
| Multiplications | $(4L + 2)N_1$ | $(2L - 1)N$ |
| Additions | $(4L - 1)N_1$ | $(2L - 1)N$ |
| Comparisons | $N_1 + N_2 - 2$ | $N - 1$ |

Figure 7:
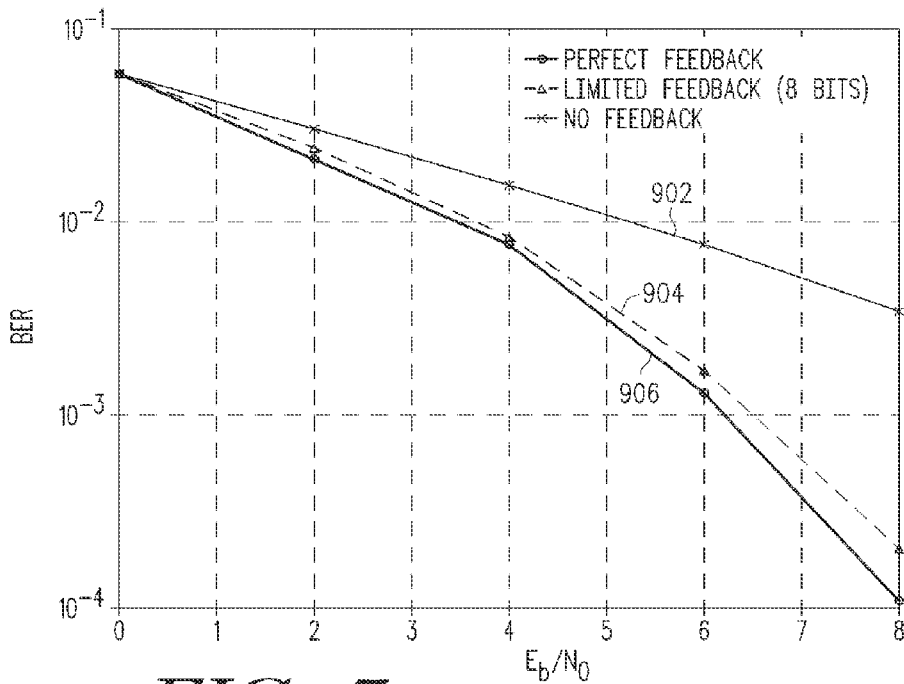
FIGS. 7-8 depict simulated comparisons of the bit error rate for various wireless communications systems having perfect feedback, limited feedback and no feedback.

Next, the performance of a limited feedback system having adaptive beamforming and power control is evaluated using a Monte Carlo simulation. In particular, FIG. 7 depicts the BER vs. $E_b/N_0$ curve for the limited feedback system 904 along with curves for the system with ideal feedback 906 and the open-loop system without precoding 902. In the simulation, a 2×1 MISO channel (two transmit antennas and one receive antenna) and BPSK modulation are assumed. The SNR gap between the limited feedback 904 and the ideal feedback 906 systems is negligible at BER=$10^{-2}$ and less than 0.5 dB at BER=$10^{-3}$. Compared with the limited feedback system 904, the open-loop system 902 requires about 1.8 dB higher SNR to achieve BER=$10^{-2}$. Moreover, the open-loop BER vs. $E_b/N_0$ curve 902 falls off with a smaller slope.

Figure 8:
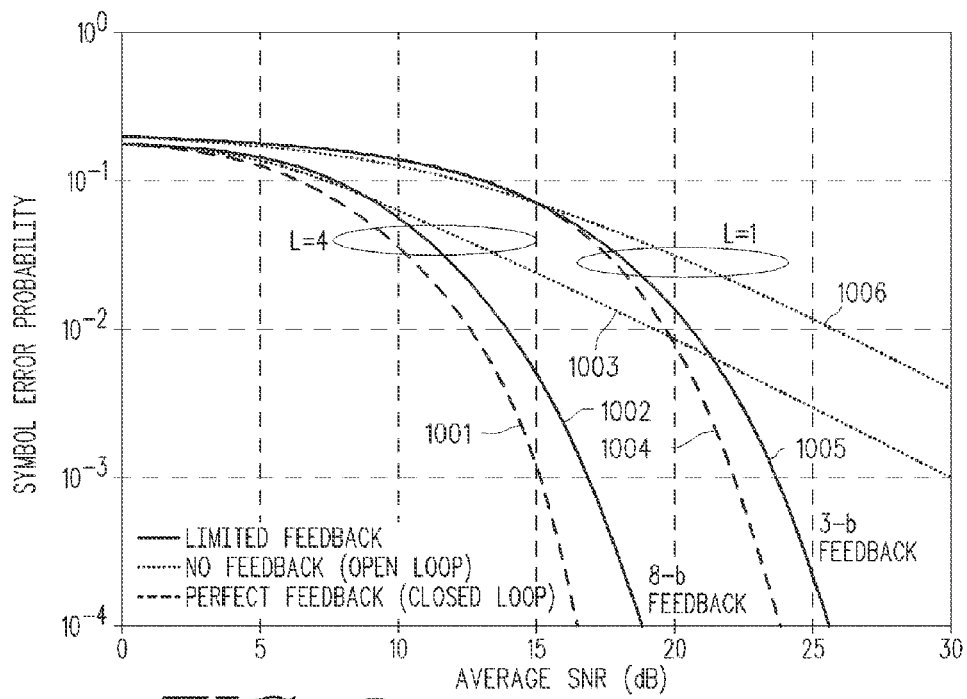

FIG. 8 shows the performance of a limited feedback system having adaptive modulation, beamforming and power control codebook parameters, as compared to corresponding ideal-feedback and open-loop systems. For the ideal feedback system, the proposed algorithm is extended to variable rate and variable power control. For the open-loop system, the transmitted data symbols are repeated on all transmit antennas without pre-multiplication with weights. For the following comparisons, MQAM modulation is used. The comparison in FIG. 8 is for a fixed average rate constraint $R_0=5$ bits to show the symbol error probability vs. average SNR curves 1001-1003 for the SISO channel (L=1), and also shows the symbol error probability vs. average SNR curves 1004-1006 for the 4×1 MISO channel (L=4). As shown by the different slopes for open-loop curves 1003, 1006 and closed-loop (limited and ideal feedback) curves 1001-1002, 1004-1005, the open-loop system is unable to harvest the diversity gain in both time and space. It can be also observed that the use of multiple (four) transmit antennas shifts all the curves for a single transmit antenna horizontally to the left with no effect on their slopes, as seen from the comparison of the multiple antenna (L=4) curves 1001-1003 and the single antenna (L=1) curves 1004-1006. At a symbol error probability=$10^{-2}$, the SNR difference between the limited feedback system and the open-loop system is about 5 dB for L=1 (compare curves 1005 and 1006), and 6 dB for L=4 (compare curves 1002 and 1003). For the same symbol error probability, the SNR difference between the limited feedback and the ideal feedback systems is about 0.5 dB for L=1 (compare curves 1004 and 1005), and 1.5 dB for L=4 (compare curves 1001 and 1002).

An advantage of using a multi-stage codebook design process may reduce the encoding complexity required for finding an optimal transmitter configuration in the codebook for the current channel state. In particular and as illustrated in FIG. 2, limited feedback requires encoding at the subscriber (receiver) and decoding at the base station (transmitter). Encoding is more complicated than decoding because with encoding, the codebooks are searched and comparisons with codewords are performed, each of which is comprised of multiple arithmetic operations. In contrast, decoding is simply reading from a memory location. Therefore, the complexity of encoding dominates the total complexity of encoding and decoding. The encoding complexity of the proposed codebook based system may be compared favorably with that of the conventional design.

By now it should be appreciated that there has been provided a closed-loop wireless communication method for quantizing estimated channel information for feedback as a codebook index. As described, a receiver receives one or more signals over a transmission channel from a transmitter, and estimates the channel state information for the transmission channel. In the course of estimating the channel state information, a phase rotation is applied to the received signals prior to quantizing the channel state information, where the phase rotation reduces a dimensionality of a vector space associated with the one or more signals. The receiver includes a codebook having a plurality of indexed multi-parameter profiles, each of which includes four or more parameters selected, for example, from a set of parameters including a scheduling parameter, a MIMO transmission scheme parameter, a precoding vector or matrix parameter, a power control parameter (for allocating transmission power in space, time and/or frequency), a modulation parameter, a codebook parameter, an error correction coding parameter and/or a channel code parameter. The codebook may be designed using a multi-stage quantization to minimize the bit error rate for a fixed spectral efficiency or to maximize the spectral efficiency for a target bit error rate (e.g., by using a combination of an eigenvector quantization stage and an eigenvalue quantization stage). As designed, the codebook provides a target link reliability measure for the transmission channel, such as a minimized bit-error-rate for a fixed spectral efficiency or a maximized spectral efficiency for a target bit error rate. Using the codebook, the channel state information is quantized by identifying a first multi-parameter profile from the codebook that corresponds to the channel state information. An index value from the codebook that is associated with the first multi-parameter profile is sent over a feedback channel to the transmitter where it is used to access codebook at the transmitter and retrieve a second multi-parameter profile that matches the first multi-parameter profile. At the transmitter, the second multi-parameter profile is used to control transmission over the transmission channel from the transmitter to the receiver.

In another form, a method is provided for quantizing a unitary space into a codebook. Under the method, a point in the unitary space to be quantized is rotated by a phase rotation to generate a metric to reduce a dimensionality of the unitary space being quantized. Subsequently, the unitary space is partitioned into a plurality of partitions by applying a nearest neighbor rule to the metric with a distance measure, and then a centroid is computed for each of the plurality of partitions, where each centroid is stored as a codebook entry. In a communication system application, each entry in the codebook may be used to represent a plurality of parameters (e.g., four or more) specifying a transmission channel profile being quantized at a receiver. When the unitary space being quantized is an eigenvector (e.g., the eigenvector u representing a transmit direction for a MISO channel or an eigenvector V representing a transmit signal direction for a MIMO channel), the distance measure is a mean square error distortion function, such as $d_1(\hat{u}; u)=\|\hat{u}e^{j\Theta}-u\|^2$, where u is the point to be quantized. Similarly, when the unitary space being quantized is an eigenvalue (e.g., an eigenvalue g representing a channel strength for a MISO channel or an eigenvalue Λ representing a channel strength for a MIMO channel), the distance measure is a mean square error distortion function.

In yet another form, a receiver is provided with one or more antennas for receiving a signal over a channel which is represented at least in part by a channel value in the form of a matrix (e.g., V or Λ) or vector (e.g., u). The receiver includes a feedback codebook for storing a plurality of multi-parameter channel profiles, each of which has a corresponding index value. In addition, a signal processor is coupled to the antenna and the codebook for quantizing an estimate of the channel by rotating the channel value by a phase rotation to generate a rotated channel value, identifying a first multi-parameter profile in the feedback codebook that corresponds to the rotated channel value, and sending a first index value corresponding to the first multi-parameter profile over a feedback channel to a transmitter.

In still yet another form, there is disclosed a closed-loop wireless communication method whereby channel state information is estimated and quantized by identifying a first multi-parameter profile from a first codebook at the receiving device that corresponds to the channel state information, where the first codebook includes a plurality of indexed multi-parameter profiles, each of which has a plurality of parameters designed to provide a target performance measure for a given data rate over the transmission channel. In various embodiments, the plurality of parameters includes first and second parameters, where the second parameter is optimized based on an optimization of the first parameter. In addition or in the alternative, the plurality of parameters are designed so as not to include one or more parameters selected from a set of parameters comprising a power control parameter, a modulation order parameter and a beamforming vector parameter. In addition or in the alternative, the plurality of parameters are designed to include parameters selected from a set comprising a scheduling parameter, a MIMO transmission scheme parameter, a precoding vector or matrix parameter, a codebook parameter, an error correction coding parameter and a channel code parameter.

In yet another form, a method and system are disclosed for quantizing a MIMO transmission channel between first and second communication devices in a beamforming system by jointly quantizing the channel directions (eigenvectors) and channel gains (eigenvalues) of the transmission channels. Channel information for the channel is estimated and used to select a transmission profile entry and associated index from a codebook at a receiver. The receiver codebook is designed by partitioning a vector channel for the transmission channel into a finite set of members, each of which comprises a unitary vector $[\hat{u}_1, \hat{u}_2 \ldots, \hat{u}_M]$ and a scalar value $[\hat{g}_1, \hat{g}_2 \ldots, \hat{g}_N]$, so that each transmission profile entry in the receiver codebook is a set of triple values indicating a beamforming vector, a modulation order and a power level that are computed from the finite set of members to achieve a predetermined performance criteria. Thus, the proposed joint quantization approach is applied to quantize the vector channel of a beamforming system into a finite set of members, each of which is comprised of a unitary vector (channel direction) and a scalar (channel gain). Based on this finite set, three codebooks are proposed for different performance criteria, which enable beamforming, adaptive modulation and power control through finite-rate feedback. In a selected embodiment, the criteria for designing the codebook is to minimize the BER under average rate and power constraints. This may be done by generating a set of probabilities $[P_1, P_2 \ldots, P_N]$ (where $P_i$ is the probability that the channel gain is quantized to be $\hat{g}_i$) and then choosing a transmission power control $$\gamma_n = \begin{cases} \frac{1}{\hat{g}_n^2} \ln \frac{\hat{g}_n^2}{2\nu} & n \geq n^{\mathring{a}} \\ 0 & n < n^{\mathring{a}}, \end{cases}$$

where $$\nu = \frac{1}{2} \exp\left( \frac{\sum_{n=n^{\mathring{a}}}^{N} \frac{\ln \hat{g}_n^2}{\hat{g}_n^2} P_n - \overline{P}_0}{\sum_{n=n^{\mathring{a}}}^{N} \frac{1}{\hat{g}_n^2} P_n} \right)$$

and where $n^{\mathring{a}}$ is a maximum integer which satisfies $$\frac{1}{\hat{g}_{n^{\mathring{a}}}^2} \ln \frac{\hat{g}_{n^{\mathring{a}}}^2}{2\nu} \geq 0,$$

to produce a product codebook $[\hat{u}_1, \ldots, \hat{u}_M] \times [\gamma_1, \ldots, \gamma_N]$ by quantizing a channel direction u and channel gain g into indices $$i = \underset{m}{\operatorname{argmax}} |\hat{u}_m^H u|^2$$

and $$j = \underset{n}{\operatorname{argmin}} (g - \hat{g}_n |\hat{u}_i^H u|)^2,$$

where $\hat{u}_i$ is applied as a beamforming vector and $\gamma_j$ is applied as a transmission power control. In another embodiment, the criteria for designing the codebook is to minimize the SER under average rate and power constraints by generating a set of probabilities $[P_1, P_2 \ldots, P_N]$ (where $P_i$ is the probability that the channel gain is quantized to be $\hat{g}_i$) and a set of scalars $[\overline{\eta}_1, \overline{\eta}_2, \ldots, \overline{\eta}_N]$ (where $\overline{\eta}_i$ is the square of the average of the channel gain values that are quantized to be $g_i$) before choosing a modulation order $$M(g^2) = \begin{cases} M_i, & M_i \leq \frac{g^2}{\eta^*} \leq M_{i+1} \\ 0, & 0 \leq \frac{g^2}{\eta^*} \leq M_1 \end{cases}$$

and a transmission power $$\xi_i^{\mathring{a}} = \frac{\gamma^{\mathring{a}}}{\overline{\eta}_i}(M(\hat{g}_i^2) - 1), (\forall i = 1, \ldots, N),$$

where $$\gamma^{\mathring{a}} = \frac{\overline{P}_0}{\sum_{i=1}^{N} \frac{M_i - 1}{\overline{\eta}_i} P_i},$$

to produce a product codebook $[\hat{u}_1, \ldots, \hat{u}_M] \times [\xi_1, \ldots, \xi_N]$ by quantizing a channel direction u and channel gain g into indices $$i = \underset{m}{\operatorname{argmax}} |\hat{u}_m^H u|^2 \text{ and } j = \underset{n}{\operatorname{argmin}} (g - \hat{g}_n |\hat{u}_i^H u|)^2,$$

where $\hat{u}_i$ is applied as a beamforming vector, $M(\hat{g}_j)$ is applied as a modulation order and $\gamma_j$ is applied as a transmission power control. In yet another embodiment, the criteria for designing the codebook is to maximize throughput under BER constraint by generating a set of probabilities $[P_1, P_2 \ldots, P_N]$ (where $P_i$ is the probability that the channel gain is quantized to be $\hat{g}_i$) and then choosing a transmission power control $$\xi_i = \begin{cases} \sum_i \frac{P_i}{\hat{g}_i^2} + \overline{P}_0 - \frac{k_0}{\hat{g}_i^2}, & i \geq i^* \\ 0, & i < i^*, \end{cases}$$

where a power constraint $$P_0 = \sum_{i=1}^{N} \xi_i P_i,$$

a rate constraint $$R = \sum_{i=1}^{N} \log_2\left(1 \frac{\hat{g}_i^2 \xi_i}{k_0}\right) P_i, \text{ and } k_o = \frac{-1}{\beta} \ln\left(\frac{BER_O}{\alpha}\right),$$

and by choosing an adaptive modulation order $$M_i = 1 + \frac{\hat{g}_i^2 \xi_i}{k_o} \; \forall \, i \geq i^*,$$

where * is found iteratively, to produce a product codebook $[\hat{u}_1, \ldots, \hat{u}_M] \times [\hat{g}_1, \ldots, \hat{g}_N]$ by quantizing a channel direction u and channel gain g into indices $$i = \underset{m}{\operatorname{argmax}} |\hat{u}_m^H u|^2 \text{ and } j = \underset{n}{\operatorname{argmin}} (g - \hat{g}_n |\hat{u}_i^H u|)^2,$$

where $\hat{u}_i$ is applied as a beamforming vector, $M_i$ is applied as a modulation order and $\xi_i$ is applied as a transmission power control. The selected index may be then fed back to a transmitter to access the selected transmission profile entry from a matching transmitter codebook that is used to control transmission to the receiver. Designed based on the concept of product code, the disclosed technique provides smaller quantization errors than a separate quantization approach, while allowing efficient two-stage implementation. In a beamforming system, by finite rate feedback and selection of a codebook entry as the transmission profile, one of the performance criteria can be satisfied.

The methods and systems for designing and using a generalized codebook design in a limited feedback system with multiple antennas as shown and described herein may be implemented in hardware or in software stored on a computer-readable medium and executed as a computer program on a general purpose or special purpose computer to perform certain tasks. For a hardware implementation, the elements used to perform various signal processing steps at the base station and/or at the subscriber station(s) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the base station and/or subscriber station(s) may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various closed-loop wireless communication systems and methods for using same, the present invention is not necessarily limited to the example embodiments illustrate herein. For example, various embodiments of a MIMO system and design methodology disclosed herein may be implemented in connection with various proprietary or wireless communication standards, such as IEEE 802.16e, 3GPP-LTE, DVB and other multi-user MIMO systems, and may also be used with any desired MISO system. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A receiver for a wireless communication system, comprising:
   one or more antennas for receiving one or more signals over a transmission channel from a transmitting device;
   a feedback codebook designed using a multi-stage quantization, which includes an eigenvector quantization stage and an eigenvalue quantization stage, and configured to store a plurality of indexed multi-parameter channel profiles, each of which has a plurality of parameters designed to provide a target performance measure for the transmission channel; and
   a signal processor coupled to the antenna and the codebook, wherein the signal processor is configured to:
      estimate channel information for the transmission channel,
      identify a first multi-parameter profile in the feedback codebook that is based on the estimated channel information, and
      send a first index value that corresponds to the first multi-parameter profile over a feedback channel to the transmitter.

2. The receiver of claim 1, wherein the first multi-parameter profile comprises any four parameters selected from a set of parameters comprising a scheduling parameter, a multiple-input and multiple-output (MIMO) transmission scheme parameter, a precoding vector or matrix parameter, a power control parameter, a modulation parameter, a codebook parameter, an error correction coding parameter and a channel code parameter.

3. The receiver of claim 1, wherein the feedback codebook is designed using the multi-stage quantization to minimize the bit error rate for a fixed spectral efficiency.

4. The receiver of claim 1, wherein the feedback codebook is designed using the multi-stage quantization to optimize a target performance measure.

5. The receiver of claim 1, wherein the target performance measure for the transmission channel comprises a minimized bit-error-rate for a fixed spectral efficiency.

6. The receiver of claim 1, wherein the target performance measure for the transmission channel comprises a maximized spectral efficiency for a target bit error rate.

7. The receiver of claim 1, wherein the plurality of parameters in each indexed multi-parameter profile comprises a first and a second parameters, where the second parameter is optimized based on an optimization of the first parameter.

8. The receiver of claim 1, wherein the plurality of parameters in each indexed multi-parameter profile comprises three or more parameters selected from a set comprising a power control parameter, a modulation order parameter, a beamforming vector parameter, a scheduling parameter, a multiple-input and multiple-output (MIMO) transmission scheme parameter, a precoding vector or matrix parameter, a codebook parameter, an error correction coding parameter and a channel code parameter.

9. A transmitter for a wireless communication system, comprising:
an array of one or more antennas for communicating with one of a plurality of receivers through a transmission channel;
a codebook at the transmitter;
a decoder configured to retrieve a transmission profile from the codebook at the transmitter based on a feedback of an index value sent from the one of the plurality of receivers over a feedback channel, where the index value is corresponding to a first multi-parameter profile from a codebook at the one of the plurality of receivers, where the transmission profile is a second multi-parameter profile that matches the first multi-parameter profile; and
one or more signal processors configured to process the transmission profile to control transmission over the transmission channel from the transmitting device to the one of the plurality of receivers.

10. The transmitter of claim 9, where the first multi-parameter profile is identified from the codebook at the one of the plurality of receivers that corresponds to an estimated channel information for the transmission channel between the transmitter and the one of the plurality of receivers.

11. The transmitter of claim 9, where the codebook at the transmitter includes a choice of MIMO scheme, modulation and channel code, and power allocation possibly in space, time and frequency for transmission to the plurality of receivers.

12. A wireless communication system, comprising:
a transmitter; and
at least one receiver, wherein the receiver comprises:
one or more antennas for receiving one or more signals over a transmission channel from the transmitting device;
a first codebook configured to store a plurality of indexed multi-parameter channel profiles, each of which has a plurality of parameters designed to provide a target performance measure for the transmission channel; and
a signal processor coupled to the antenna and the codebook, wherein the signal processor is configured to:
quantize an estimate of the channel by rotating on the received one or more signal to generate a rotated channel value,
identify a first multi-parameter profile in the feedback codebook that corresponds to the rotated channel value, and
send a first index value that corresponds to the first multi-parameter profile over a feedback channel to the transmitter for use in accessing a second codebook at the transmitting device to retrieve a second multi-parameter profile that matches the first multi-parameter profile, where the second multi-parameter profile is used to control transmission over the transmission channel from the transmitting device to the receiving device.

13. The receiver of claim 12, wherein the first multi-parameter profile comprises any four parameters selected from a set of parameters comprising a scheduling parameter, a multiple-input and multiple-output (MIMO) transmission scheme parameter, a precoding vector or matrix parameter, a power control parameter, a modulation parameter, a code book parameter, an error correction coding parameter and a channel code parameter.

14. The receiver of claim 12, wherein the first code book is designed using a multi-stage quantization to minimize the bit error rate for a fixed spectral efficiency.

15. The receiver of claim 12, wherein the first code book is designed using a multi-stage quantization to optimize a target performance measure.

16. The receiver of claim 15, wherein the multi-stage quantization comprises an eigenvector quantization stage and an eigenvalue quantization stage.

17. The receiver of claim 12, wherein the target performance measure for the transmission channel comprises a minimized bit-error-rate for a fixed spectral efficiency.

18. The receiver of claim 12, wherein the target performance measure for the transmission channel comprises a maximized spectral efficiency for a target bit error rate.

* * * * *